United States Patent
Zhang et al.

(10) Patent No.: US 12,449,549 B2
(45) Date of Patent: Oct. 21, 2025

(54) DISPERSION GATING-BASED ATMOSPHERIC COMPOSITION MEASUREMENT LASER RADAR

(71) Applicant: University of Science and Technology of China, Hefei (CN)

(72) Inventors: Zhen Zhang, Anhui (CN); Mingjia Shangguan, Anhui (CN); Haiyun Xia, Anhui (CN); Xiankang Dou, Anhui (CN); Xianghui Xue, Anhui (CN)

(73) Assignee: University of Science and Technology of China, Hefei (CN)

( * ) Notice: Subject to any disclaimer, the term of this patent is extended or adjusted under 35 U.S.C. 154(b) by 1184 days.

(21) Appl. No.: 17/297,125

(22) PCT Filed: Jul. 22, 2019

(86) PCT No.: PCT/CN2019/096980
§ 371 (c)(1),
(2) Date: May 26, 2021

(87) PCT Pub. No.: WO2021/000359
PCT Pub. Date: Jan. 7, 2021

(65) Prior Publication Data
US 2022/0026577 A1     Jan. 27, 2022

(30) Foreign Application Priority Data
Jul. 2, 2019     (CN) .......................... 201910591972.5

(51) Int. Cl.
*G01S 17/95*     (2006.01)
*G01S 7/487*     (2006.01)
(Continued)

(52) U.S. Cl.
CPC ............ *G01S 17/95* (2013.01); *G01S 7/4876* (2013.01); *H01S 3/0057* (2013.01);
(Continued)

(58) Field of Classification Search
CPC .... G01S 7/4802; G01S 7/4814; G01S 7/4816; G01S 7/484; G01S 7/486; G01S 7/487;
(Continued)

(56) References Cited

U.S. PATENT DOCUMENTS

| 7,777,940 B1 * | 8/2010 | Delfyett | .............. H01S 3/06754 |
| | | | 359/333 |
| 2006/0231771 A1 | 10/2006 | Lee et al. | |

(Continued)

FOREIGN PATENT DOCUMENTS

| CN | 104019898 A | 9/2014 |
| CN | 105423943 A | 3/2016 |

(Continued)

OTHER PUBLICATIONS

International Search Report and Written Opinion for International Application No. PCT/CN2019/096980, mailed Mar. 26, 2020.
(Continued)

*Primary Examiner* — Yuqing Xiao
(74) *Attorney, Agent, or Firm* — Wolf, Greenfield & Sacks, P.C.

(57) ABSTRACT

A dispersion gating-based atmospheric composition measurement laser radar. The atmospheric composition measurement laser radar stretches a femtosecond laser into a broad pulse laser in a time domain by means of dispersion. A femtosecond spectrum is mapped into the broadened laser pulse due to the group velocity dispersion, and then is subjected to time domain gating by means of an intensity modulator (22, 26) for completing the selection of a laser of a preset wavelength. The laser wavelength scanning is achieved by adjusting the delay of an electrical drive signal of the intensity modulator (22, 26). An absorption spectrum of a specific atmospheric composition is obtained by means of laser wavelength scanning so as to measure the concen-
(Continued)

tration of the atmospheric gas composition. The atmospheric composition measurement laser radar can precisely perform free gating on the wavelength where the laser emits, and has high precision in selecting the wavelength. Scanning and detection of a plurality of gases can be achieved by adjusting the center wavelength of a filter.

7 Claims, 6 Drawing Sheets

(51) Int. Cl.
  *H01S 3/00* (2006.01)
  *H01S 3/10* (2006.01)
(52) U.S. Cl.
  CPC .......... *H01S 3/0078* (2013.01); *H01S 3/0085* (2013.01); *H01S 3/10046* (2013.01)
(58) Field of Classification Search
  CPC ........ G01S 7/4876; G01S 17/10; G01S 17/88; G01S 17/95; G01N 21/31; G01N 33/0036; H01S 3/10046; H01S 3/0085; H01S 3/0078
  See application file for complete search history.

(56) References Cited

U.S. PATENT DOCUMENTS

| | | | | |
|---|---|---|---|---|
| 2007/0024946 | A1* | 2/2007 | Panasyuk | A61B 5/416 |
| | | | | 359/253 |
| 2007/0215795 | A1* | 9/2007 | Kameyama | G01S 7/491 |
| | | | | 250/222.2 |
| 2007/0242705 | A1* | 10/2007 | Faure | H05H 15/00 |
| | | | | 372/5 |
| 2010/0040095 | A1* | 2/2010 | Mielke | H01S 3/2308 |
| | | | | 372/25 |
| 2010/0177794 | A1* | 7/2010 | Peng | H01S 3/2316 |
| | | | | 372/25 |
| 2013/0322806 | A1* | 12/2013 | Hoffmann | G02F 1/025 |
| | | | | 385/2 |
| 2015/0083918 | A1* | 3/2015 | Emmenegger | G01N 33/0036 |
| | | | | 250/341.1 |
| 2018/0188376 | A1* | 7/2018 | Yi | G01S 17/95 |
| 2020/0166406 | A1* | 5/2020 | Ota | G02F 1/365 |

FOREIGN PATENT DOCUMENTS

| | | | | |
|---|---|---|---|---|
| CN | 105675576 A | | 6/2016 | |
| CN | 107024850 A | | 8/2017 | |
| CN | 107462900 A | | 12/2017 | |
| CN | 107688187 A | * | 2/2018 | ............ G01S 17/58 |
| CN | 107796781 A | | 3/2018 | |
| CN | 108415030 A | | 8/2018 | |
| CN | 108415031 A | | 8/2018 | |
| WO | WO 2019/062844 A1 | | 4/2019 | |

OTHER PUBLICATIONS

First Office Action for Chinese Application No. 201910591972.5, dated Feb. 21, 2024.

Lin et al., Wavelength Choice for Infrared Laser Based on Atmospheric CO2 Concentration Wide Spectrum Measurement. Laser & Optoelectronics Progress. Dec. 10, 2015;52:120102; 6 pages. doi: 10.3788/LOP52.120102.

* cited by examiner

DISPERSION GATING-BASED ATMOSPHERIC COMPOSITION MEASUREMENT LASER RADAR

The present application is a national stage filing under 35 U.S.C. § 371 of International Patent Application No. PCT/CN2019/096980, titled "DISPERSION GATING-BASED ATMOSPHERIC COMPOSITION MEASUREMENT LASER RADAR", filed on Jul. 22, 2019, which claims the priority to Chinese Patent Application No. 201910591972.5, titled "LIDAR FOR DETECTING ATMOSPHERIC COMPOSITION BASED ON TIME-STRETCH AND TAILORING", filed on Jul. 2, 2019, with the China National Intellectual Property Administration. The contents of these applications are incorporated herein by reference in their entirety.

FIELD

The present disclosure relates to the technical field of lidar, and in particular to a lidar for detecting atmospheric composition based on time-stretch and tailoring.

BACKGROUND

The detection of atmospheric composition plays an important role in climatology, meteorological research, detection of biological and chemical weapon releasing, the prevention of forest fires, and the prevention of air pollution.

Among the current detection methods, in-situ detection techniques include: differential optical absorption spectroscopy (Differential Optical Absorption Spectroscopy, abbreviated as DOAS), non-dispersive infrared (Non-Dispersive Infrared, abbreviated as NDIR), cavity ring-down spectroscopy (Cavity Ring-down Spectroscopy, abbreviated as CRDS), incoherent broadband cavity-enhanced absorption spectroscopy (Incoherent Broadband Cavity-Enhanced Absorption Spectroscopy, abbreviated as IBBCEAS), laser-induced fluorescence (Laser-induced Fluorescence, abbreviated as LIF), ultraviolet-visible spectroscopy (Ultraviolet-visible spectroscopy, abbreviated as UV-Vis), tunable diode laser absorption spectroscopy (Tunable Diode Laser Absorption Spectroscopy, abbreviated as TDLAS), etc. Though these techniques can realize the high-precision detection of various gaseous constituents, they cannot acquire the spatial distribution of gas concentration. The lidar is an effective technique to acquire the high-precision spatial-temporal distribution of gas concentration.

According to different detection mechanisms, lidars for detecting gases can be categorized into differential absorption lidar, Raman lidar, and high spectral resolution lidar.

At present, the differential absorption lidar, which is the most commonly used, usually uses laser with two wavelengths. The laser with one wavelength has a strong absorption cross section on the gas to be measured, and the laser with the other wavelength has a weak absorption cross section on the gas to be measured. By detecting the ratio between echo signals of the two laser beams, the composition of the gas to be measured at different distances can be determined.

At present, the differential absorption lidar has already realized the detection of various gases, such as $H_2O$, $CO_2$, CO, HCl, $NH_3$, $NO_2$, $SO_2$, and $O_3$. However, one disadvantage of differential absorption lidar is that it can only detect single gaseous constituent.

The high spectral resolution wavelength scanning lidar can acquire the composition information of different gases through scanning the spectrum. However, one disadvantage of this lidar is the complexity of its system, since the wavelength tuning performed by the PZT or the motor necessitates real-time calibration and locking of the wavelength of the emitted laser.

SUMMARY

In view of the above, a lidar for detecting atmospheric composition based on time-stretch and tailoring is provided according to the embodiments of the present disclosure to solve the above technical problems. The technical solutions are as follows.

A lidar for detecting atmospheric composition based on time-stretch and tailoring includes: a femtosecond laser, a time-stretch and tailoring apparatus, a laser pulse amplifying apparatus, a laser transceiving apparatus, an atmosphere background noise filtering module, a detection apparatus, a signal acquisition apparatus, and a data processing apparatus.

The femtosecond laser is configured to output a femtosecond laser pulse;
  the time-stretch and tailoring apparatus is configured to perform time-stretch on the femtosecond laser pulse and tailor a spectrum of the femtosecond laser pulse in time domain, to output a first target laser pulse with a predetermined wavelength;
  the laser pulse amplifying apparatus is configured to generate a second target laser pulse by amplifying power of the first target laser pulse;
  the laser transceiving apparatus is configured to transmit the second target laser pulse into the atmosphere after compressing a divergence angle of the second target laser pulse, and receive an echo signal from the atmosphere;
  the atmosphere background noise filtering module is configured to process noises in the echo signal from the atmosphere;
  the detection apparatus is configured to detect the echo signal from the atmosphere and output a corresponding electrical signal;
  the signal acquisition apparatus is configured to acquire the electrical signal; and
  the data processing apparatus is configured to process the electrical signal to obtain concentration information of gaseous constituents of the atmosphere.

Preferably, in the lidar for detecting atmospheric composition, the time-stretch and tailoring apparatus includes: a first optical filter, a first intensity modulator, a time-stretch device, a laser preamplifier, a second optical filter, and a second intensity modulator.

The first optical filter is configured to filter the femtosecond laser pulse to select femtosecond laser within an absorption spectrum of gases;
  the first intensity modulator is configured to reduce a repetition frequency of the femtosecond laser pulse outputted by the femtosecond laser, to increase an effective detection distance of the lidar for detecting atmospheric composition;
  the time-stretch device is configured to perform time-stretch on the femtosecond laser pulse for mapping from spectrum to pulses;
  the laser preamplifier is configured to amplify wide-pulse laser generated through the time-stretch, to compensate for losses caused by the filter and the time-stretch device;

the second optical filter is configured to shape a spectrum of the wide-pulse laser; and the second intensity modulator is configured to select a pulse with the predetermined wavelength from the shaped wide-pulse laser in time domain, where the selected pulse is the first target laser pulse.

Preferably, in the lidar for detecting atmospheric composition, the second optical filter is a programmable optical filter.

Preferably, the lidar for detecting atmospheric composition further includes a parameter optimizing apparatus.

The parameter optimizing apparatus is configured to optimize parameters of the first intensity modulator, the time-stretch device and the second intensity modulator, to regulate the center wavelength and the spectrum width of a laser pulse obtained by the tailoring.

Preferably, the lidar for detecting atmospheric composition further includes a tuning apparatus.

The tuning apparatus is configured to tune a delay of the second intensity modulator to realize scanning by the laser, to obtain absorption spectral lines of gases to be measured for concentration measurement of gaseous constituents.

Preferably, in the lidar for detecting atmospheric composition, the first optical filter is further configured to tailor a spectrum of the femtosecond laser to realize the detection of different gaseous constituents.

Preferably, in the lidar for detecting atmospheric composition, a wavelength of the femtosecond laser is in a range from ultraviolet waveband to infrared waveband.

Preferably, in the lidar for detecting atmospheric composition, the detection apparatus is a single-photon detector.

Preferably, in the lidar for detecting atmospheric composition, the laser transceiving apparatus includes a beam expander and an optical telescope.

The beam expander is configured to transmit the second target laser pulse into the atmosphere after compressing the divergence angle of the second target laser pulse, and the optical telescope is configured to receive the echo signal from the atmosphere.

The present disclosure has the following beneficial effects over conventional technology.

By the lidar for detecting atmospheric composition, femtosecond laser pulse is time-stretched into wide-pulse laser through dispersion, where a spectrum of the femtosecond laser is mapped to the stretched laser pulse by group velocity dispersion; laser with predetermined wavelengths are selected by tailoring of an intensity modulator in time domain; and scanning over laser wavelengths is achieved by tuning a delay of an electrical drive signal of an intensity modulator. An absorption spectrum of specific constituents is obtained by the scanning over the laser wavelengths, thereby measuring the concentrations of gaseous constituents of the atmosphere.

The lidar for detecting atmospheric composition can accurately select emitted laser with any wavelength with high precision and fast speed. In addition, scanning and detection of multiple gases can be realized by tuning a center wavelength of the filter.

BRIEF DESCRIPTION OF THE DRAWINGS

The drawings to be used in the description of the embodiments or the conventional technology will be described briefly as follows, so that the technical solutions according to the embodiments of the present disclosure or according to the conventional technology will become clearer. It is apparent that the drawings in the following description only illustrate some embodiments of the present disclosure. For those skilled in the art, other drawings may be obtained according to these drawings without any creative work.

DETAILED DESCRIPTION OF EMBODIMENTS

In the following, the technical solutions of the embodiments of the present disclosure will be described clearly and completely in conjunction with the accompanying drawings of the embodiments of the present disclosure. Apparently, the described embodiments are some rather than all embodiments of the present disclosure. All other embodiments obtained by those skilled in the art based on these embodiments of the present disclosure without any creative work fall within the scope of protection of the present disclosure.

In order to make the above objectives, features, and advantages of the present invention more clear and understandable, the present invention will be further described in detail below with reference to the accompanying drawings and specific embodiments.

Figure 1:
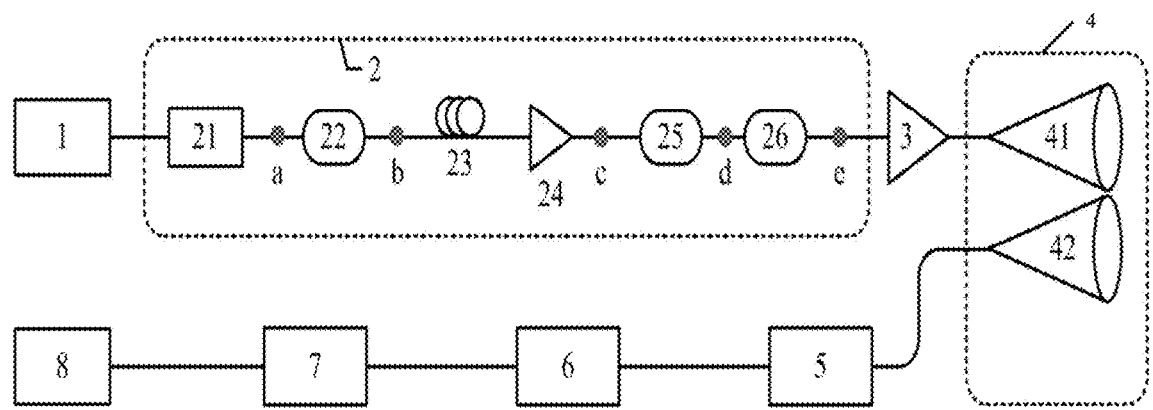
FIG. 1 shows a structural schematic diagram of a lidar for detecting atmospheric composition based on time-stretch and tailoring according to an embodiment of the present disclosure.

Reference is made to FIG. 1, which shows a structural schematic diagram of a lidar for detecting atmospheric composition based on time-stretch and tailoring according to an embodiment of the present disclosure. The lidar for detecting atmospheric composition includes a femtosecond laser 1, a time-stretch and tailoring apparatus 2, a laser pulse amplifying apparatus 3, a laser transceiving apparatus 4, an atmosphere background noise filtering module 5, a detection apparatus 6, a signal acquisition apparatus 7, and a data processing apparatus 8.

The femtosecond laser 1 is configured to output a femtosecond laser pulse;

the time-stretch and tailoring apparatus 2 is configured to perform time-stretch on the femtosecond laser pulses and tailor a spectrum of the femtosecond laser pulse in time domain to output a first target laser pulse with a predetermined wavelength;

the laser pulse amplifying apparatus 3 is configured to generate a second target laser pulse by amplifying power of the first target laser pulse;

the laser transceiving apparatus 4 is configured to transmit the second target laser pulse into the atmosphere after compressing a divergence angle of the second target laser pulse, and receive an echo signal from the atmosphere;

the atmosphere background noise filtering module 5 is configured to process noises in the echo signal from the atmosphere (specifically, filter out solar background noises and sky background noises, to improve a signal-to-noise ratio of detection);

the detection apparatus 6 is configured to detect the echo signal from the atmosphere and output a corresponding electrical signal;

the signal acquisition apparatus 7 is configured to acquire the electrical signal; and the data processing apparatus 8 is configured to process the electrical signal to obtain concentration information of gaseous constituents of the atmosphere.

By the lidar for detecting atmospheric composition according to this embodiment, femtosecond laser is stretched into wide-pulse laser in time domain through dispersion, where a spectrum of the femtosecond laser is mapped to the stretched laser pulse by group velocity dispersion; laser with predetermined wavelengths are selected by tailoring of an intensity modulator in time domain; and scanning over laser wavelengths is achieved by tuning a delay of an electrical drive signal of an intensity modulator. An absorption spectrum of specific constituents is obtained by the scanning over the laser wavelengths, thereby measuring the concentrations of gaseous constituents of the atmosphere.

The lidar for detecting atmospheric composition can accurately select emitted laser with any wavelength with high precision and fast speed. In addition, scanning and detection of multiple gases can be realized by tuning a center wavelength of a filter.

Further, based on the above embodiment of the present disclosure, as shown in FIG. 1, the time-stretch and tailoring apparatus 2 includes a first optical filter 21, a first intensity modulator 22, a time-stretch device 23, a laser preamplifier 24, a second optical filter 25, and a second intensity modulator 26.

The first optical filter 21 is configured to filter the femtosecond laser pulse to select femtosecond laser within an absorption spectrum of gases;

the first intensity modulator 22 is configured to reduce a repetition frequency of the femtosecond laser pulse outputted by the femtosecond laser to increase an effective detection distance of the lidar for detecting atmospheric composition;

the time-stretch device 23 is configured to perform time-stretch on the femtosecond laser pulse for mapping from spectrum to pulses;

the laser preamplifier 24 is configured to amplify wide-pulse laser generated through the time-stretch, to compensate for losses caused by the filter and the time-stretch device;

the second optical filter 25 is configured to shape a spectrum of the wide-pulse laser; and the second intensity modulator 26 is configured to select a pulse with the predetermined wavelength in time domain, that is, the first target laser pulse, from the shaped wide-pulse laser.

In this embodiment, the femtosecond laser is stretched into wide-pulse laser in time domain through dispersion. After the wide-pulse laser is gated by the intensity modulator in time domain, the selection of laser with a specific wavelength is completed. A center wavelength and a bandwidth of the laser are determined by dispersion amount and a drive signal from the intensity modulator. Through scanning over wavelengths of emitted laser, the measurement for the absorption spectrum of gases in the atmosphere is realized so as to obtain concentrations of gaseous constituents of the atmosphere. This embodiment can realize the precise control of the center wavelength and linewidth of the emitted laser, thereby measuring the absorption spectrum of the gases.

Optionally, the second optical filter 25 is a programmable optical filter.

Further, based on the above embodiments of the present disclosure, as shown in FIG. 1, the laser transceiving apparatus 4 includes a beam expander 41 and an optical telescope 42.

The beam expander 41 is configured to transmit the second target laser pulse into the atmosphere after compressing the divergence angle of the second target laser pulse, and the optical telescope 42 is configured to receive the echo signal from atmosphere.

In this embodiment, the optical telescope 42 is configured to receive echo signals from atmosphere generated by interaction of the laser with the atmosphere.

Figure 2:
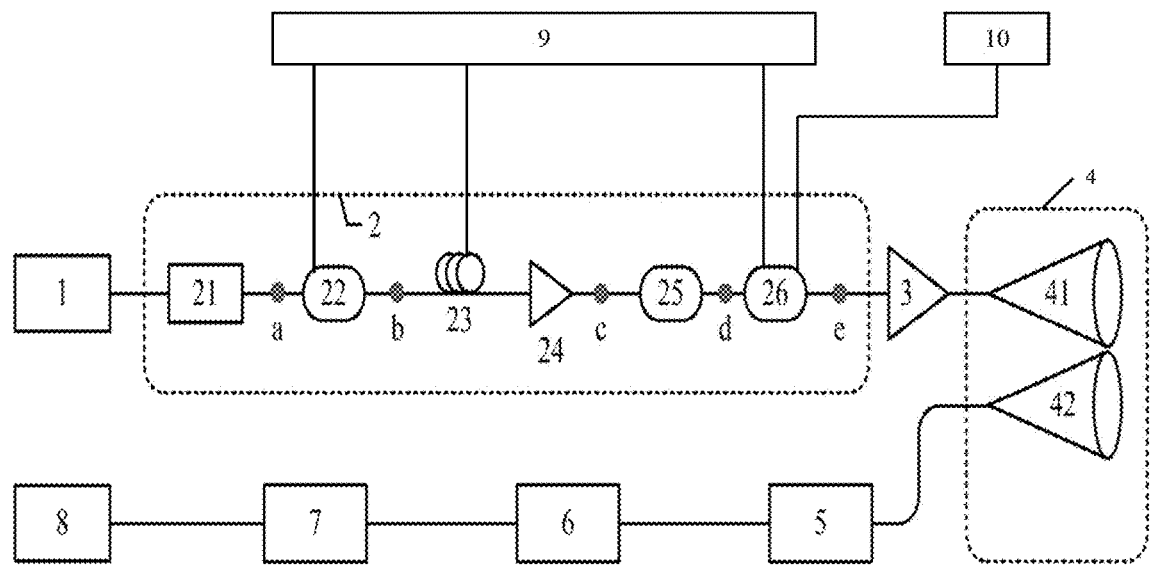
FIG. 2 shows a structural schematic diagram of another lidar for detecting atmospheric composition based on time-stretch and tailoring according to an embodiment of the present disclosure.

Further, based on the above embodiments of the present disclosure and with reference to FIG. 2, where FIG. 2 shows a structural schematic diagram of another lidar for detecting atmospheric composition based on time-stretch and tailoring according to an embodiment of the present disclosure, the lidar for detecting atmospheric composition further includes a parameter optimizing apparatus 9.

The parameter optimizing apparatus 9 is configured to optimize parameters of the first intensity modulator 22, the time-stretch device 23 and the second intensity modulator 26, to regulate a center wavelength and a spectrum width of a laser pulse obtained by the tailoring.

Further, based on the above embodiments of the present disclosure, as shown in FIG. 2, the lidar for detecting atmospheric composition further includes a tuning apparatus 10.

The tuning apparatus 10 is configured to tune a delay of the second intensity modulator 26 to realize scanning by the laser, to obtain absorption spectral lines of gases to be measured to realize concentration measurement of gaseous constituents.

Further, the first optical filter 21 is further configured to tailor the femtosecond laser pulse, to realize the detection of different gaseous constituents.

Further, a wavelength of the femtosecond laser 1 is in a range from ultraviolet waveband to infrared waveband.

Further, the detection apparatus 6 is a single-photon detector.

The specific working principles of the lidar are described as follows based on the above embodiments of the present disclosure.

Figure 3:
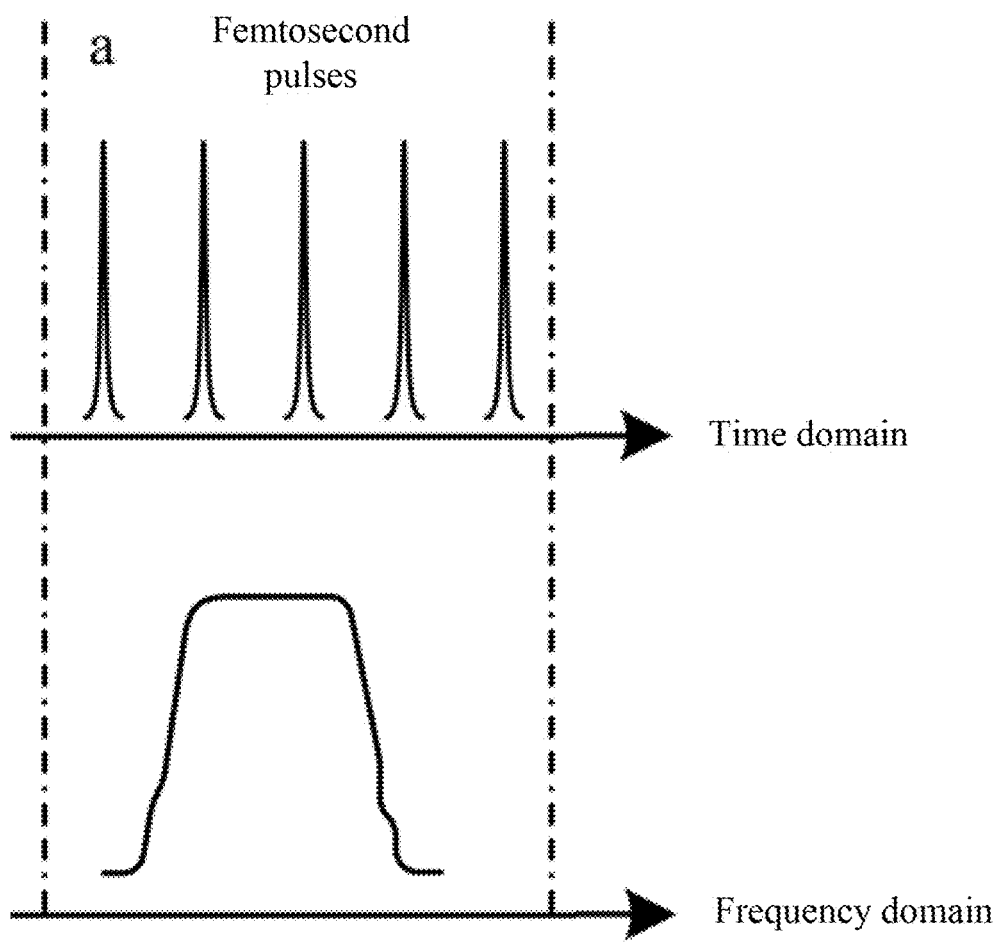
FIG. 3 shows a schematic diagram of a signal in frequency domain and time domain at a position according to an embodiment of the present disclosure.

Reference is made to FIG. 3, which shows a schematic diagram of a signal in frequency domain and time domain at a position according to an embodiment of the present disclosure.

As shown in FIG. 3, which corresponds to point a in FIG. 1 between the first optical filter 21 and the first intensity modulator 22, an intensity of the laser pulse in time domain is reduced, and in frequency domain, a spectral range of the laser is modulated by the filter to select wavelengths corresponding to an absorption spectrum of gases.

Figure 4:
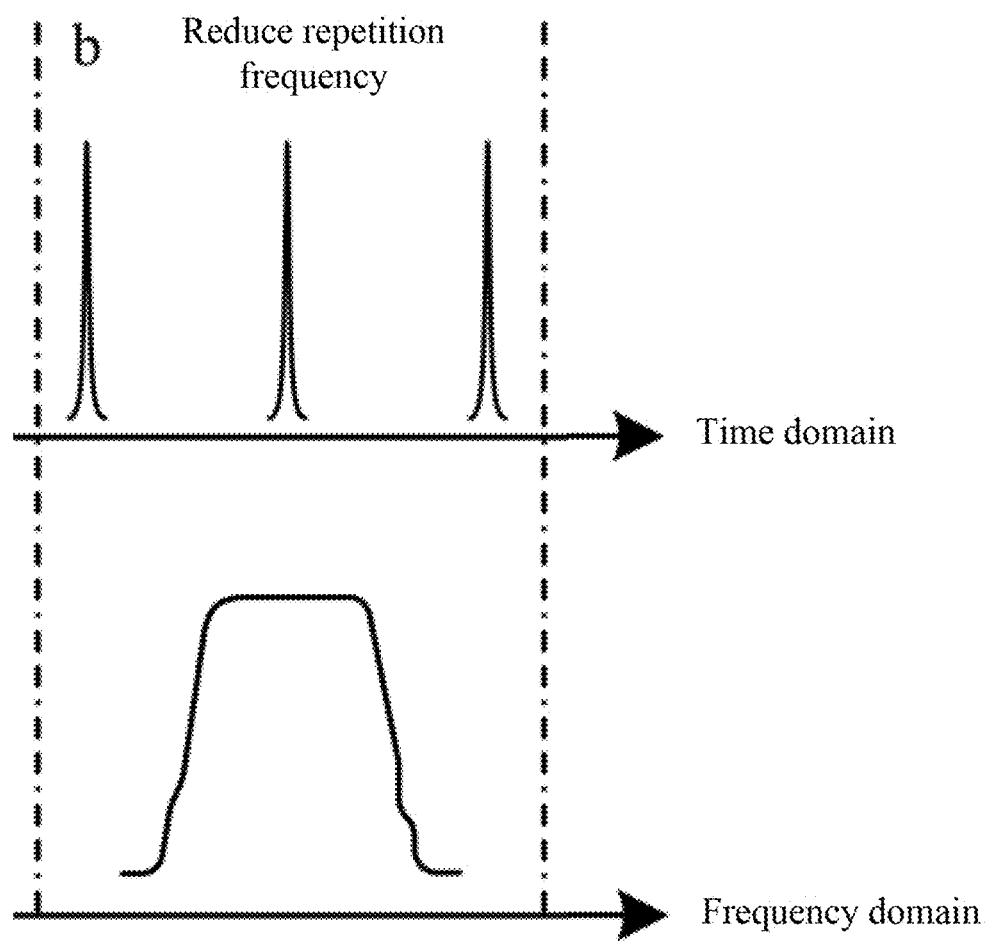
FIG. 4 shows a schematic diagram of a signal in frequency domain and time domain at another position according to an embodiment of the present disclosure.

Reference is made to FIG. 4, which shows a schematic diagram of a signal in frequency domain and time domain at another position according to an embodiment of the present disclosure.

As shown in FIG. 4, which corresponds to point b in FIG. 1 between the first intensity modulator 22 and the time-stretch device 23, the spectrum does not change, but the repetition frequency of the femtosecond laser pulse is reduced, so as to facilitate the long-distance detection of the lidar.

Figure 5:
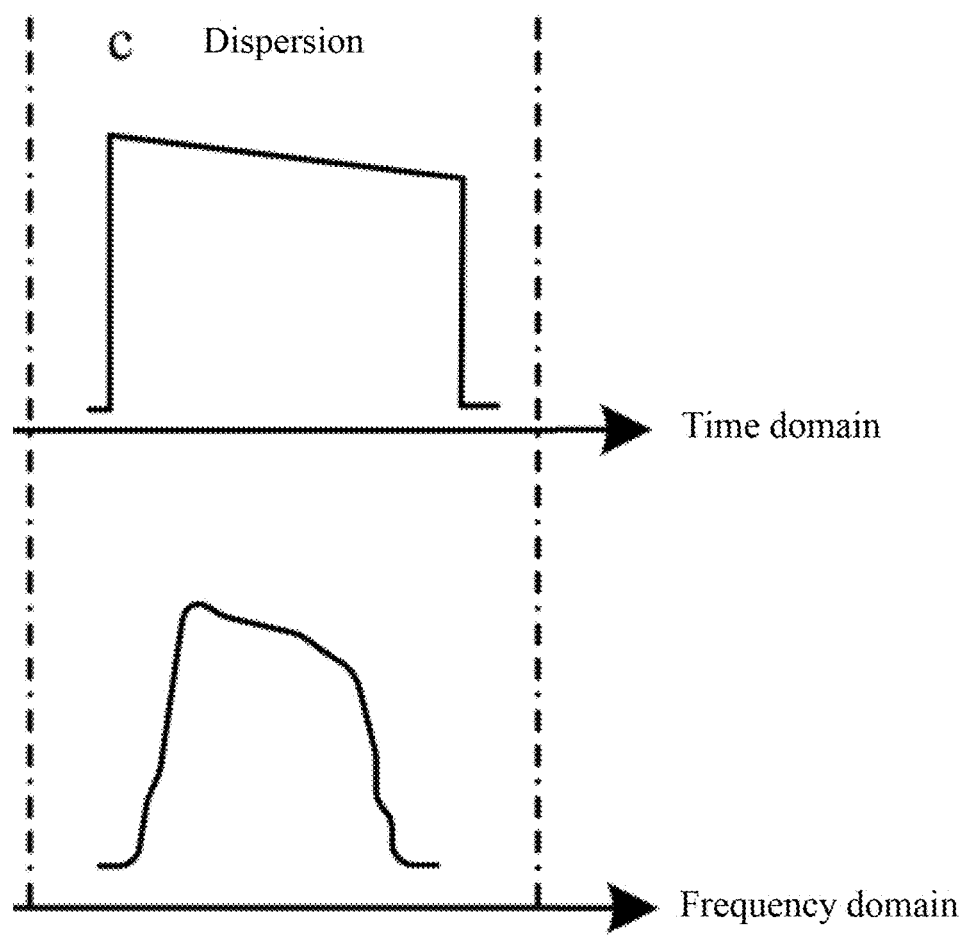
FIG. 5 shows a schematic diagram of a signal in frequency domain and time domain at another position according to an embodiment of the present disclosure.

Reference is made to FIG. 5, which shows a schematic diagram of a signal in frequency domain and time domain at another position according to an embodiment of the present disclosure.

As shown in FIG. 5, which corresponds to point c in FIG. 1 following the time-stretch device 23, the spectrum does not change, but a width of the femtosecond laser pulse is increased due to group velocity dispersion and the spectrum of the femtosecond laser pulse is separated in time domain, so that mapping between spectrum and pulse is formed.

Figure 6:
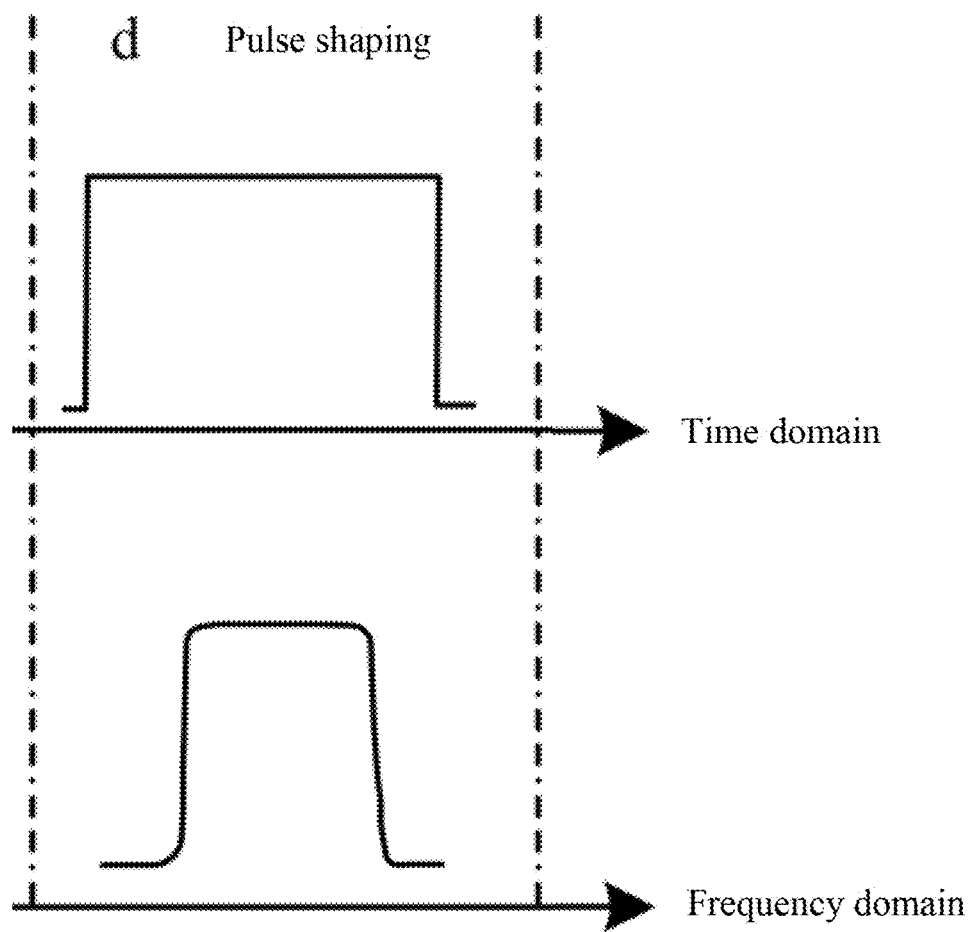
FIG. 6 shows a schematic diagram of a signal in frequency domain and time domain at another position according to an embodiment of the present disclosure.

Reference is made to FIG. 6, which shows a schematic diagram of a signal in frequency domain and time domain at another position according to an embodiment of the present disclosure.

As shown in FIG. 6, which corresponds to point d in FIG. 1 following the second optical filter 25, due to the differences in the responses of the laser preamplifier 24 to different wavelengths and different time-domain signals, the spectrum and the pulse shape are changed after pulse laser passes through the second optical filter. Thus, the second optical filter 25 can be used to shape the spectrum of the laser pulse so as to facilitate the detection of the absorption spectrum of the gases.

Figure 7:
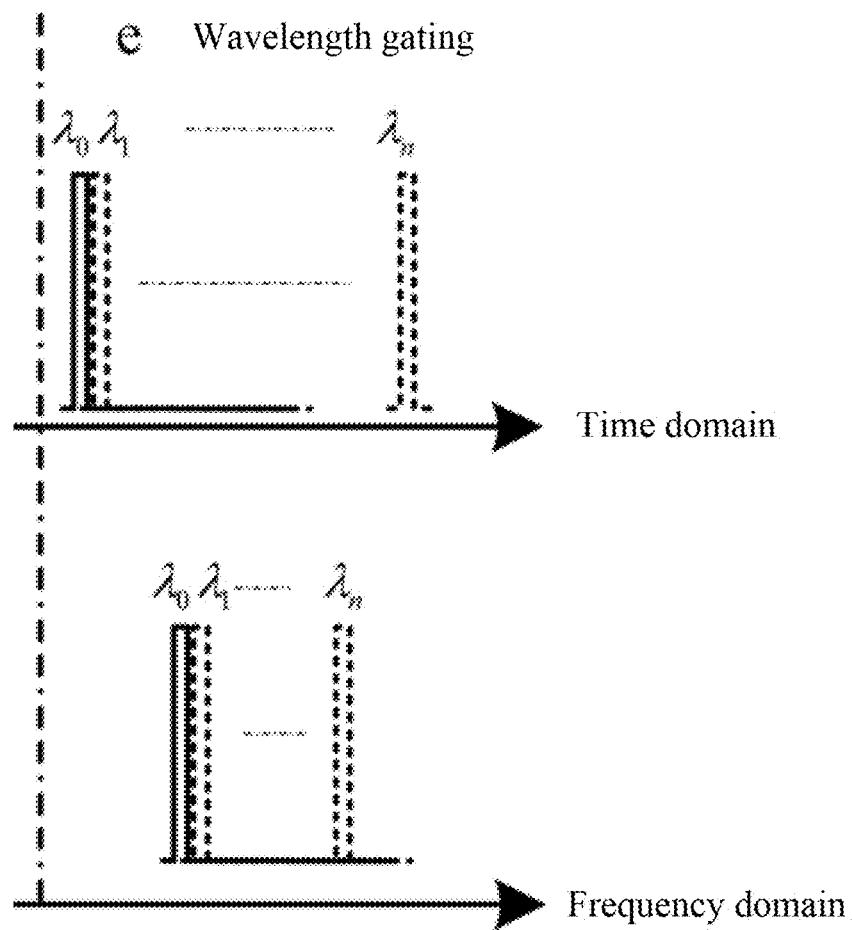
FIG. 7 shows a schematic diagram of a signal in frequency domain and time domain at another position according to an embodiment of the present disclosure.

Reference is made to FIG. 7, which shows a schematic diagram of a signal in frequency domain and time domain at another position according to an embodiment of the present disclosure.

As shown in FIG. 7, which corresponds to point e in FIG. 1 following the second intensity modulator 26, since the center wavelength ($\lambda_0$, $\lambda_1$ ... $\lambda_n$) of the pulse laser is different at different moments, a laser pulse with the predetermined wavelength can be selected in sequence by tailoring of the second intensity modulator 26 in time domain.

At present, the modulation speed of intensity modulators is constantly improving, and especially the speed of intensity modulators based on lithium niobate can reach tens of GHz. Therefore, as long as the drive inputted to the intensity modulator is fast enough and the time-stretch of the femtosecond pulses is large enough, the laser with the predetermined wavelength and even each single longitudinal mode of the femtosecond laser pulse can be picked out.

According to the above embodiments of the present disclosure, the lidar for detecting atmospheric composition stretches the femtosecond laser into wide-pulse laser in time domain through dispersion. The selection of the laser with a specific wavelength is completed after the wide-pulse laser is gated in time domain by the intensity modulator. The center wavelength and bandwidth of the laser are determined by the dispersion amount and a drive signal of the intensity modulator, and the scanning over the laser wavelengths is realized by tuning the delay of the electrical drive signal of the intensity modulator. The absorption spectrum of atmospheric gases is measured by scanning over the wavelengths of the emitted laser, thereby obtaining the concentrations of gaseous constituents in the atmosphere. The lidar for detecting atmospheric composition can accurately control the center wavelength and line width of the emitted laser, thereby measuring the absorption spectrum of the gases.

The lidar for detecting atmospheric composition based on time-stretch and tailoring according to the present disclosure is described above in detail. In this disclosure, specific examples are used to explain the principles and implementation of the present invention. The description of the above embodiments is only for helping understand the method of the present invention and its core idea. In addition, those of ordinary skill in the art may make changes in specific implementation and application range based on the idea of this disclosure. In summary, the above description should not be interpreted as a limitation to the present invention.

It should be noted that the various embodiments in this specification are described herein in a progressive manner where each of the embodiments is described with emphasis on the difference between it and the other embodiment, and that reference can be made to each other of the embodiments for similar parts. The apparatus according to the embodiments is only described briefly for it corresponds to the method according to the embodiments, and reference can be made to the description of the method for related parts.

It should be further noted that relational terms such as "the first" and "the second" herein are only used to distinguish one entity or operation from one another, but does not necessitate or imply that there is an actual relationship or sequence between these entities or operations. Furthermore, terms "include", "comprise" or any other variations are intended for non-exclusive inclusion, so that a process, a method, an object or a device including a series of elements not only include the elements, but also includes other elements not explicitly listed, or also includes inherent elements of the process, the method, the object or the device. Without more limitation, the statement "include a . . . " preceding an element does not exclude the presence of same elements in the process, the method, the object or the device including the described element.

The above description of the embodiments enables those skilled in the art to implement or use the present disclosure. Various modifications to these embodiments are apparent to those skilled in the art, and the general principle defined herein may be implemented in other embodiments without deviating from the spirit or scope of the present disclosure. Therefore, the present disclosure is not limited to these embodiments described herein, but shall accord with the widest scope consistent with the principle and novel features disclosed herein.

The invention claimed is:

1. A lidar for detecting atmospheric composition based on time-stretch and tailoring, comprising a femtosecond laser, a time-stretch and tailoring apparatus, a laser pulse amplifying apparatus, a laser transceiving apparatus, an atmosphere background noise filtering module, a detection apparatus, a signal receiver, and a data processing apparatus, wherein, the femtosecond laser is configured to output a femtosecond laser pulse;

the time-stretch and tailoring apparatus is configured to perform time-stretch on the femtosecond laser pulse and tailor a spectrum of the time-stretched femtosecond laser pulse in time domain, wherein the spectrum of the time-stretched femtosecond laser pulse corresponds to a plurality of laser pulses respectively with different wavelengths in time domain, and the time-stretch and tailoring apparatus is configured to select a first target laser pulse with a predetermined wavelength from the plurality of laser pulses and output the selected first target laser pulse, wherein the predetermined wavelength is one of the different wavelengths;

the laser pulse amplifying apparatus is configured to generate a second target laser pulse by amplifying power of the first target laser pulse;

the laser transceiving apparatus is configured to transmit the second target laser pulse into the atmosphere after compressing a divergence angle of the second target laser pulse, and receive an echo signal from the atmosphere;

the atmosphere background noise filtering module is configured to process noises in the echo signal from the atmosphere;

the detection apparatus is configured to detect the echo signal from the atmosphere and output a corresponding electrical signal;

the signal receiver is configured to acquire the electrical signal; and the data processing apparatus is configured to process the electrical signal to obtain concentration information of gaseous constituents of the atmosphere.

2. The lidar for detecting atmospheric composition according to claim 1, wherein the time-stretch and tailoring apparatus comprises a first optical filter, a first intensity modulator, a time-stretch device, a laser preamplifier, a second optical filter, and a second intensity modulator, wherein, the first optical filter is configured to filter the femtosecond laser pulse to select femtosecond laser within an absorption spectrum of gases;

the first intensity modulator is configured to reduce a repetition frequency of the femtosecond laser pulse outputted by the femtosecond laser, to increase an effective detection distance of the lidar for detecting atmospheric composition;

the time-stretch device is configured to perform time-stretch on the femtosecond laser pulse for mapping from spectrum to pulses;

the laser preamplifier is configured to amplify the time-stretched femtosecond laser pulse generated through the time-stretch, to compensate for losses caused by the first optical filter and the time-stretch device;

the second optical filter is configured to shape the spectrum of the time-stretched femtosecond laser pulse as amplified; and the second intensity modulator is configured to select a pulse with the predetermined wavelength from the spectrum of the time-stretched femtosecond laser pulse as shaped in time domain, wherein the selected pulse is the first target laser pulse.

3. The lidar for detecting atmospheric composition according to claim 2, wherein the second optical filter is a programmable optical filter.

4. The lidar for detecting atmospheric composition according to claim 2, wherein the first optical filter is further configured to tailor a spectrum of the femtosecond laser for detection of different gaseous constituents.

5. The lidar for detecting atmospheric composition according to claim 1, wherein a wavelength of the femtosecond laser is in a range from ultraviolet waveband to infrared waveband.

6. The lidar for detecting atmospheric composition according to claim 1, wherein the detection apparatus is a single-photon detector.

7. The lidar for detecting atmospheric composition according to claim 1, wherein the laser transceiving apparatus comprises a beam expander and an optical telescope, wherein the beam expander is configured to transmit the second target laser pulse into the atmosphere after compressing the divergence angle of the second target laser pulse, and the optical telescope is configured to receive the echo signal from the atmosphere.

* * * * *